Figure 1:
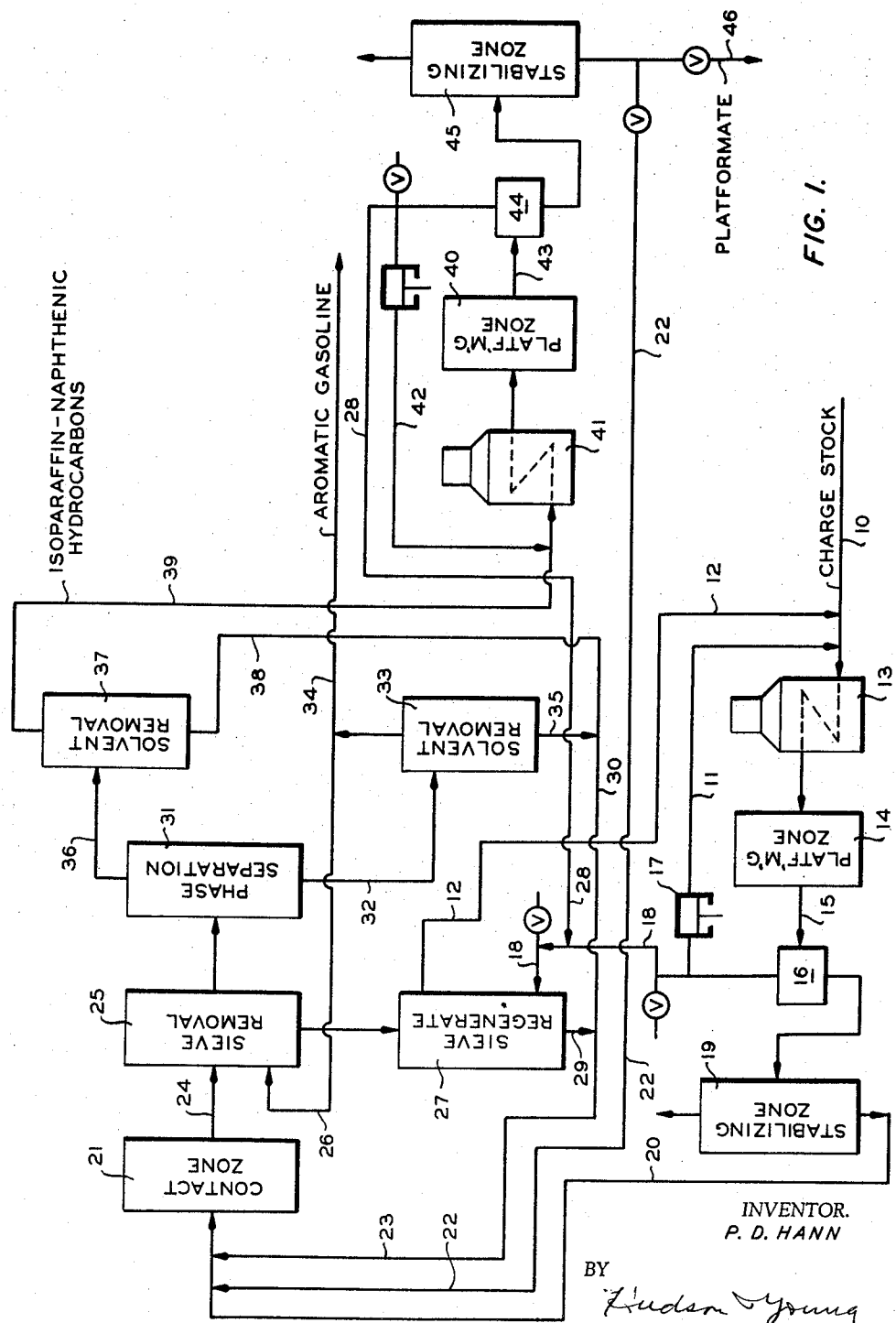
Figure 2:
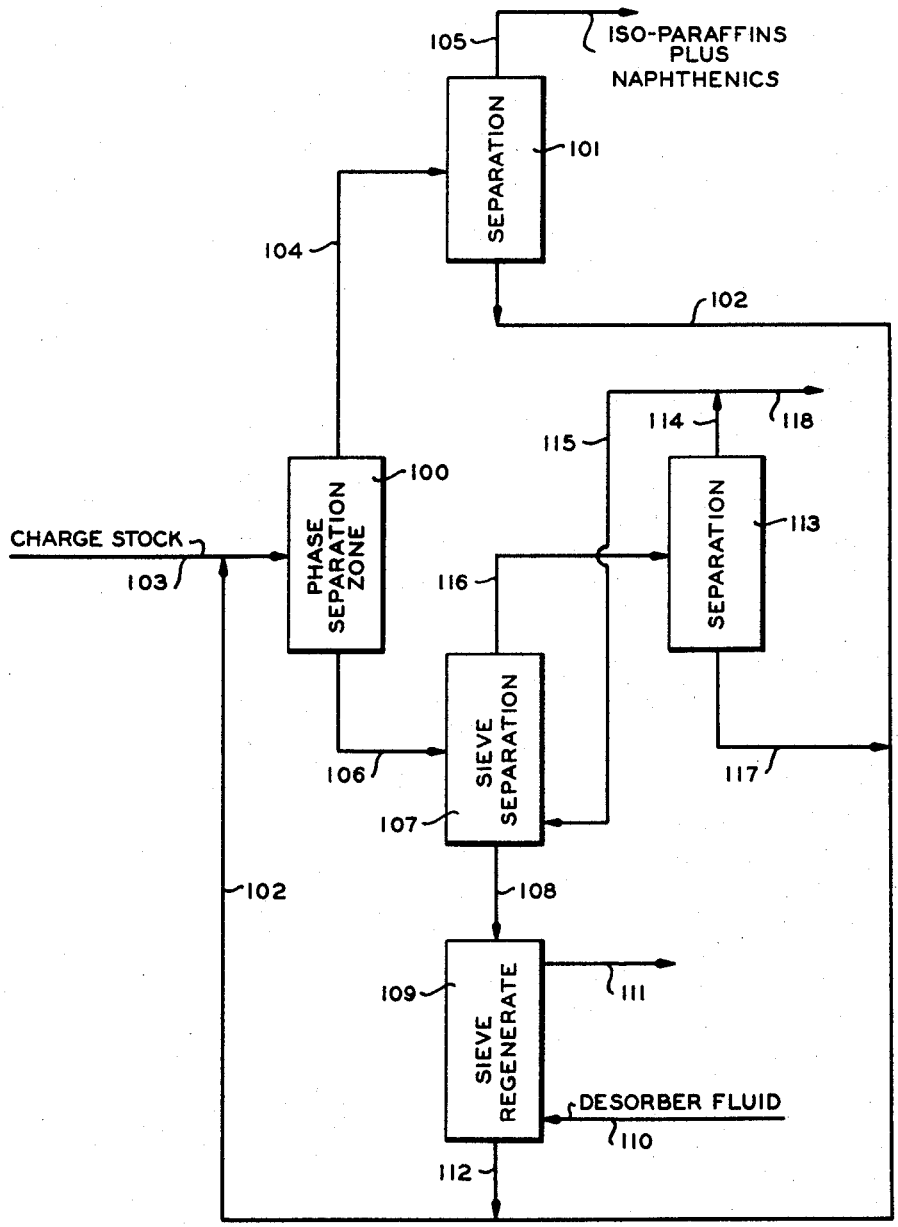

INVENTOR.
P. D. HANN

United States Patent Office 2,956,015
Patented Oct. 11, 1960

2,956,015

COMBINED SOLID ADSORBENT AND LIQUID ABSORBENT AND METHOD OF USING SAME

Paul D. Hann, Bartlesville, Okla., assignor to Phillips Petroleum Company, a corporation of Delaware Filed Oct. 18, 1956, Ser. No. 616,777

10 Claims. (Cl. 208—310)

This invention relates to a process involving adsorption and absorption. In one of its aspects, the invention relates to the provision of a combination of a solid adsorbent and a liquid absorbent or solvent. In another aspect, the invention relates to the use of such a combination as just described to resolve a material into at least some of its component parts by contacting said material with said combination. In a further aspect, the invention relates to a process and a treating agent combination for separating a hydrocarbon into normal, iso, naphthenic, and aromatic portions or fractions by contacting a hydrocarbon material containing such portions or fractions with said treating agent combination. In a more specific aspect, the invention relates to the use of a solid contact selectively adsorbent material known as a solid adsorbent sieve in combination with an absorbent liquid or solvent which is characterized in that it is not received into the solid.

It is known to use molecular or solid adsorbent sieves to separate normal hydrocarbons from materials containing the same. Also, it is known to employ liquid solvents to remove aromatic hydrocarbons from materials containing the same. Furthermore, it is known to employ a combination of liquid solvents in a single contacting zone. In the event that it would be desired to employ a process wherein the hydrocarbon is first treated by contact with a molecular sieve to remove normal hydrocarbons and then by contact with a liquid absorbent or selective solvent in order to remove, say, aromatics therefrom, it is necessary to employ two separate zones for the two separate contactings which would be required.

I have now found that it is possible to add together, so to speak, a solid adsorbent on the one-hand and a liquid absorbent or solvent on the other hand which is not absorbed into the interstics or pores of the adsorbent. Further, I have found that a combination which results from such addition is preeminently useful for resolving hydrocarbon mixtures into component parts, portions or fractions according to chemical type.

It is an object of this invention to provide a combination of a solid adsorbent and a liquid absorbent. Further, it is an object of the invention to provide such a combination for resolving a fluid into its component parts, for example, a hydrocarbon into its component constituents according to chemical type. Still further, it is an object of this invention to provide a unitary process for the separation of components of hydrocarbon fractions or materials according to chemical type. A more specific object of the invention is the resolution of a hydrocarbon material into normal, iso, naphthenic, and aromatic portions.

Other aspects, objects and the several advantages of this invention are apparent from a study of this disclosure, the drawing and the appended claims.

According to the present invention, a solid adsorbent admixed with or in suspension in a liquid absorbent is employed to remove certain components from a liquid material such as a hydrocarbon mixture. This is accomplished by contacting the hydrocarbon mixture with a slurry or suspension of the solid adsorbent in a liquid absorbent, as will now be more fully described.

Since the invention is particularly applicable to the resolution of hydrocarbon mixtures such as obtained in the so-called platforming type of operation, it will be described largely or for the most part in connection with such an operation.

Thus, according to the invention, there is provided a process for resolving a reformed gasoline into a normal hydrocarbon, an iso-naphthenic hydrocarbon and an aromatic hydrocarbon for further processing, employing as a separating agent a slurry of a solid adsorbent in a liquid absorbent, the adsorbent being capable of removing the normal hydrocarbons, and the absorbent being capable of removing the aromatic hydrocarbons during the contacting of the material undergoing treatment with the said slurry or suspension.

It will be noted at once that only one contacting zone is required and that the presence of the solid adsorbent and the liquid absorbent in the same zone in presence of each other tends to enhance the respective separations which are being accomplished.

As the solid adsorbent, I prefer to employ those materials known as "molecular sieves," for example, Linde Molecular Sieve Type 5A. This material is capable of removing the normal hydrocarbons up to about $C_{14}$ from a fluid containing them. As the liquid absorbent, in which the solid is dispersed, say, in slurry form, it is preferred to use a material whose molecular size is greater than the pore diameter of the sieve, e.g., greater than 5 angstroms, or one which in any event is not appreciably adsorbed by the solid adsorbent. Furthermore, the liquid absorbent is one which is selective to aromatic type materials. Such absorbents are known in the art, e.g., furfural, phenol, etc. The only limitation on the liquid absorbent is that it be selective to the aromatics and not capable of passing through the pores of the solid sieve employed so that this liquid is not appreciably adsorbed.

For the process hereinafter described, I shall, for illustrative purposes, use a slurry of the Linde Molecular Sieve Type 5A and phenol. I do not intend to be limited to this sieve nor this solvent, however. Furthermore, the process is not limited to separation of the described gasoline-type hydrocarbons, nor to only hydrocarbon materials. It is within the skill of the art, in view of this disclosure, to process liquid or vaporous materials with a different adsorbent solid or combination of solids in a different liquid solvent or combination of solvents; the essence of the invention being the resolving of a fluid into its component separable parts by means of a slurry or suspension of an adsorbent or adsorbents in a solvent or solvents, wherein the solid or solids are selective to one or more of the components and the solvent or solvents are selective to one or more of the remaining components, and that the solvent is not received into the solids.

In the drawings, Figure I is a diagrammatic flow plan of a complete operation wherein there is accomplished in combination two catalytic reforming operations and a treatment with a combination of a solid adsorbent and a liquid absorbent or solvent. Figure II shows a variation of the embodiment of Figure I in which phase separation of a mixture of solid adsorbent, liquid solvent and hydrocarbon materials occurs before an extract phase is separated from the sieve material.

Referring now to Figure I, a naphthenic charge material of relatively low octane, boiling in the range of 150 to 450° F. introduced via line 10 along with recycled hydrogen 11 and a normal paraffin material 12, to be described hereinafter, is charged through heater or furnace 13 into a conventional first catalytic reformer 14. The ranges of operating conditions in this catalytic reforming step ordinarily are: Temperature, 800–1000° F., preferably 875 to 975° F.; pressure, within the range of 400 to 700 p.s.i.g., preferably in the range of 450–600 p.s.i.g.; volume space velocity, within the range of 0.2 to 5.0 volumes of charge per volume of catalyst per hour, preferably within the range of 2.5 to 3.5 volumes per volume per hour. The reforming ordinarily will be carried out in the presence of hydrogen ordinarily present in a mol ratio of hydrogen to total charge within the range of 4:1 to 10:1, preferably about 8:1. Product effluent 15 is flashed to about 350–400 p.s.i.g. in separator 16, the hydrogen stream so separated in part being compressed 17 and returned to the heater 13 via line 11 as above described. A second portion of the hydrogen-containing stream is removed via line 18 for further use as hereinafter described. The platformer fluid from 16 is stabilized (debutanized) in separator 19 and is charged via line 20 to contact zone 21.

Into contact zone 21 are introduced the reformed gasoline 20, an isonaphthenic aromatic containing hydrocarbon 22 to be described hereinafter, and a slurry of liquid phenol and solid molecular sieve of 5 angstrom pore diameter via line 23, to be further described hereinafter. The range of sieve to liquid solvent is in the range to form a flowable suspension and depends on the particular solvent used and the percentage of normal hydrocarbons and aromatics present in the charge. The optimum quantities and ratios of adsorbent-absorbent to oil are readily determined by laboratory techniques. In this specific example, I employ a sieve of about 1/16 inch diameter pellets suspended in the phenol in the range of about 10 to 60 weight percent sieve in the suspension treating reagent, and more preferably about 30 to 40 weight percent. The volume ratio of charge to treating reagent is about 1:2 to 1:10, preferably about 1:5. The temperature of treating is sufficiently high to maintain the phenol in the liquid state and the pressure is sufficient to maintain the hydrocarbon preferably in a liquid state. The preferred temperature range is between about 110 and 150° F., and at a pressure substantially atmospheric or slightly above. The contact time of charge and reagent is a range of about 10 to 120 minutes, preferably about 30 to 60 minutes.

The charge hydrocarbon and treating agent are passed via line 24 to sieve separation zone 25 which may be an Oliver filter, or equivalent solids-liquid separation means known in the art. The separated sieve is washed free of surface adsorbed liquid solvent by means of wash stream 26 to be described later, which is preferably a slip stream of the product aromatics. The sieve is passed to regeneration zone 27 wherein a hydrogen stream 18 and/or 28, preferably heated, from the first and/or second platforming zones is employed to free the sieve of normal hydrocarbon.

The use of hydrogen in 27, as described herein, is described and claimed in Serial Number 555,607, filed December 27, 1955 by Jesse M. Brooke and is not considered a part of this invention.

The separated normal hydrocarbon and hydrogen are passed via line 12 to the first catalytic reforming zone as previously described, as a recycle of normal hydrocarbons to further convert these to more valuable materials. The regenerated sieve is passed via line 29 and is carried back to the contact zone 21 via line 23 by means of recovered liquid solvent in line 30. Eductor means may be employed to effect the introduction of solids into the liquid or other conventional means known in the art. Conditions of regeneration usually are: temperature range of 300 to 600° F., preferably 350 to 400° F.; and the amount of hydrogen eluent will usually be in the range of 1.5 to 20 pound mols of hydrogen per pound mol of adsorbate to be desorbed, preferably within the range of 3 to 10 pound mols of hydrogen per pound mol of adsorbate to be desorbed. The pressure employed is preferably the pressure of the hydrogen stream, about 300 to 500 p.s.i.g.

The sieve-free liquid from 25 is charged to phase separation zone 31 wherefrom an extract of phenol and aromatics is recovered and charged via 32 to conventional solvent removal means 33. The aromatics are removed as high octane gasoline product 34 and a slip stream 26 is returned to zone 25 for washing the sieve, as previously described. Recovered phenol is returned to the contacting step 21 via lines 35, 30, and 23. The raffinate from zone 31 is passed via 36 to conventional solvent recovery zone 37. Recovered solvent 38 is also returned to contact zone 21 via lines 38, 30, and 23. The separated isohydrocarbon-naphthenic hydrocarbon stream 39 is passed to a second platforming step 40 via furnace or heater 41 in the presence of recycled hydrogen 42. The platformate 43 is separated from hydrogen in 44, the hydrogen being in part compressed and recycled via 42 to the platformer 40 and in part charged via 28 as part of the eluent used in sieve regenerator 27. The platformate is stabilized 45 and passed via 22 to the process of my invention to separate the aromatics from the nonaromatics as above described. The aromatic portion from zone 45 is ultimately removed via line 34. A portion of the platformate from 45 is yielded to prevent buildup of non-aromatic materials in the system due to the recycling step.

Conditions in catalytic reformer 40 are usually less severe than in unit 14. The temperature range is ordinarily 700 to 950° F., preferably 840 to 940° F.; and the pressure is 300 to 550 p.s.i.g.; preferably 350 to 500 p.s.i.g.

Figure II, as stated, shows a variation of the embodiment of Figure I in which phase separation zone 100 is first employed to remove from the combined solid and liquids which have been contacted as a separate stream a raffinate phase containing some liquid absorbent or solvent. This solvent is recovered in separation zone 101 from the (isoparaffins-naphthenics) raffinate oil. Thus, a circuit of the liquid solvent is completed by way of line 102, 103, phase separation zone 100 and line 104. The raffinate oil is removed from separation zone 101 by line 105. Solid, liquid and extract are passed from zone 100 by way of line 106 to sieve separation 107. In separation zone 107, the solid or sieve material and normal paraffins are removed by way of line 108 into sieve regeneration zone 109. In zone 109, normal paraffins are desorbed from the sieve material by a desorbing agent introduced by way of line 110 and removed, together with the normal paraffins, by way of line 111. Solid is taken by way of line 112 into line 102 and thus, reused. In sieve separation zone 107, the sieve material is contacted with a stream of aromatics to remove from the sieve material any liquid solvent which, of course, will contain some aromatics. To this end, from separation zone 113, there is passed a slip-stream of aromatics by way of line 114 and 115 to the separation zone 107 and removed therefrom by way of line 116 to separation zone 113, wherein aromatics are separated from the liquid solvent, the aromatics being removed, as noted, by way of line 114 and the liquid solvent being removed by way of line 117 into line 102. Produced aromatics are removed by way of line 118. Generally, the condition in the respective zones of Figure II will be obvious to one skilled in the art in possession of this disclosure and having studied the same.

Generally, it will be obvious to said one skilled in the art that the invention provides a modus operandi which is applicable to the problem of separation in the chemical arts, as a general tool. Although the invention, when it is being executed, involves selection of solids and certain liquids which can be termed "chemicals," its concept is, in part, based upon the combination of the adsorbent and the absorbent or the adsorbents and the absorbents and upon the general flow diagram set forth or variations thereof. One skilled in the art, having studied the disclosure, will be able to select additional solid adsorbents and additional liquid absorbents and to combine them, such selections involving mere routine testing to determine whether they meet the invention herein set forth and claimed in the appended claims.

Liquid solvents which may be employed with the sieve materials in the invention are those solvents which are not adsorbed by the sieve, and which solvents are selective to at least one component of a material treated, which component is also not capable of being adsorbed by the sieve materials. Among such solvents are, e.g., phenol, nitrobenzene, furfural, etc.

Solid sieve materials which may be employed with the liquid solvents are those sieves which do not adsorb the solvent used, and which sieves are selective to adsorb at least one component of the material being treated, which component is also not selectively absorbed by the solvent. Such sieve materials are usually comprised of sodium, calcium, aluminum, silicon, and oxygen, and are a structure of definite crystalline pattern containing a large number of small cavities connected by a number of smaller pores. These pores and cavities are normally uniform in size and comprise about 50 percent of the total volume of the crystals. Such sieve materials applicable in the invention are various naturally occurring zeolites or synthetic zeolites. Applicable materials are the various crystalline alumina-silicates which have been heated to remove water of hydration. Of the three classes of crystalline zeolites, fibrous, laminar, and rigid three dimensional anionic networks, the last mentioned class only is suitable in my invention. Furthermore, the interstitial dimensions must be sufficiently large for the sieve to sorb straight chain hydrocarbons but sufficiently small to exclude branched chain and/or cyclic hydrocarbons, and the solvent. Examples of such materials are chabazite, phacolite, gmelinite, harmotome, and the like, or suitable modifications thereof. The particular sieve used in the example of my invention is known to those skilled in the art as Linde Molecular Sieve Type 5A.

In a specific operation, as described with reference to Figure I, the following data show the separations of normal paraffins, isoparaffins, naphthenics, and aromatics from a charge stream containing same, using liquid phenol as the absorbent with Linde type 5A molecular sieve as the adsorbent.

| | |
|---|---|
| Fresh charge (10), B/H | 1000 |
| Composition, B/H: | |
| n-paraffins | 400 |
| Iso-paraffins | 100 |
| Naphthenics | 460 |
| Aromatics | 40 |
| Recycle (12), B/H, (less hydrogen) | 667 |
| Composition, B/H: | |
| n-paraffins | 667 |
| Product (20), B/H (stabilized platformate) | 1452 |
| Composition, B/H: | |
| n-paraffins | 667 |
| Iso-paraffins | 245 |
| Naphthenics | 80 |
| Aromatics | 460 |
| Charge (39), B/H (to second platformer) | 325 |
| Composition, B/H: | |
| Iso-paraffins | 245 |
| Naphthenics | 80 |
| Product (46), B/H (stabilized platformate) | 281 |
| Composition, B/H: | |
| Iso-paraffins | 208 |
| Naphthenics | 14 |
| Aromatics | 59 |
| Aromatic product (34), B/H | 460 |
| Composition, B/H: | |
| Aromatics | 460 |

In the above example, the product from the second reforming operation is removed via line 46. It is within the scope of my invention to also recycle a portion of said product to the absorbent-adsorbent zone of the invention via line 22 to recover additional aromatics therefrom.

Reasonable variation and modification are possible within the scope of the foregoing disclosure, the drawing, and the appended claims to the invention, the essence of which is the resolving of a fluid into its component or separable part by means of a slurry or suspension of an adsorbent or adsorbents in a solvent or solvents, wherein the solid or solids are selective to one or more of the components and the solvent or solvents are selective to one or more of the remaining components and that the solvent is not received into the solids.

I claim:

1. A process for the resolution of a hydrocarbon fluid mixture containing at least two different types of specific hydrocarbons into at least some of its component or separable parts which comprises contacting said fluid with a suspension of an adsorbent in a solvent, the adsorbent being a solid selective to at least one of the components of said fluid and the solvent being a liquid selective to at least one of the remaining components of said fluid, the said solid and any solvent being characterized in that the solvent used in the process is not received into the pores of the solid adsorbent, after said contacting, separating said solid adsorbent and said solvent from each other and separately recovering from each of said solid adsorbent and said solvent, after their separation, the specific hydrocarbon components adsorbed and absorbed, respectively, thereon and therein, the specific hydrocarbon recovered from the solid adsorbent being of a type selectively adsorbed thereby and the specific hydrocarbon being recovered from said solvent being of a different type selectively adsorbed by said solvent, the selectivities involved being exhibited when said solid adsorbent and said solvent are each of them in the presence of the other.

2. The separation of a catalytically reformed hydrocarbon material into a fraction rich in aromatics and other fractions containing normal hydrocarbons, isoparaffin hydrocarbons, and naphthenic hydrocarbons which comprises contacting said hydrocarbon with a solid adsorbent dispersed in a liquid solvent, any solvent used in the separation being characterized in that the solvent is not received into the pores of the solid adsorbent, the said solid adsorbent being selective to normal hydrocarbons and the said liquid being selective to aromatics, and being capable of undergoing a phase separation when said aromatic hydrocarbons are present therein to yield a phase containing said liquid rich in aromatics and poor in isohydrocarbons and naphthenic hydrocarbons, after said contacting separating said solid adsorbent and said solvent from each other and separately recovering from each of said solid adsorbent and said solvent, after their separation, the aromatic hydrocarbons absorbed in said solvent from said solvent, the normal hydrocarbons adsorbed in said solid adsorbent from said solid adsorbent, and recovering also as a third and separate stream, isoparaffinic hydrocarbons and naphthenic hydrocarbons which were not adsorbed in said solid adsorbent and which were not absorbed in said liquid solvent.

3. A process according to claim 2 wherein the said adsorbent is a molecular sieve and said liquid absorbent is selected from the group consisting of furfural, phenol, and nitrobenzene.

4. A process for recovering an aromatic gasoline fraction from a catalytically reformed hydrocarbon containing fractions boiling within the gasoline boiling range which comprises catalytic reforming hydrocarbon material containing hydrocarbon compounds which, upon catalytic reforming, yield compounds boiling within the gasoline boiling range, effecting said catalytically reforming operation in the presence of hydrogen, obtaining a reformed fraction, contacting said reformed fraction with a mixture combination of an adsorbent adapted to adsorb normal hydrocarbons and being a solid in suspension in a liquid absorbent capable of absorbing aromatic hydrocarbons, and being capable of phase separation to provide a phase of said liquid containing substantial proportion of aromatic hydrocarbons and only small quantities of isohydrocarbons and naphthenic hydrocarbons, any solvent used in the separation being characterized in that the solvent is not received into the pores of the solid adsorbent, recovering from said contacting a solid adsorbent material containing normal hydrocarbons, recovering the normal hydrocarbons from said solid adsorbent material, causing phase separation to occur in the liquid remaining after removal of said solid adsorbent material to obtain said phase containing aromatic hydrocarbons and recovering aromatic hydrocarbons from said phase, using hydrogen from said catalytic reforming operation to remove normal hydrocarbons from said solid adsorbent and cycling said normal hydrocarbons and hydrogen to said catalytic reforming operation, cycling some of the aromatics into contact with the combined mixture of solid adsorbent and liquid absorbent and hydrocarbons obtained upon said first contacting to remove all liquid from said solid adsorbent containing adsorbed therein the said normal hydrocarbon, removing some aromatics as product of the process, treating the other phase resulting upon the separation of the aromatics-containing phase to recover therefrom liquid solvent and isohydrocarbon-naphthenic hydrocarbon mixture, subjecting said last-obtained mixture to catalytic reforming in the presence of hydrogen to obtain additional quantities of reformed hydrocarbon, cycling said additional quantities of reformed hydrocarbon to said first contacting, obtaining hydrogen from said last catalytic reforming and cycling the same to the step in which normal hydrocarbon is removed from said adsorbent.

5. A process according to claim 4 wherein after contacting said catalytically reformed fraction with said mixture combination of said adsorbent and said absorbent, the the entire contacted admixture is subjected to a phase separation in a phase separation zone from which there is taken off a phase rich in iso and naphthenic hydrocarbon and a phase containing the solid adsorbent, the liquid absorbent, the normal hydrocarbon and aromatics; said last-mentioned phase is subjected to separation to remove therefrom the solid adsorbent and normal hydrocarbons, leaving a residual liquid solvent and aromatics; the residual liquid is separated into aromatics and liquid solvent and wherein the solid adsorbent is treated to recover therefrom the normal hydrocarbons.

6. A continuous process for the resolution of a hydrocarbon fluid mixture into at least some of its component or separable parts which comprises continuously contacting said fluid mixture with a suspension of an adsorbent in a solvent, the adsorbent being a solid selective to at least one of the components of said fluid and the solvent being a liquid selective to at least one of the remaining components of said fluid, any solvent used in the separation being characterized in that the solvent is not received into the pores of the solid adsorbent, separating the solvent from said solid and separately recovering at least one component of said fluid from each of said solvent and said solid and then reusing said solvent and said solid for treatment of further quantities of said fluid.

7. A process for the resolution of a hydrocarbon fluid mixture into at least some of its component or separable parts which comprises contacting said fluid with a suspension of a molecular sieve adsorbent in a solvent, the adsorbent being a solid selective to at least one of the components of said fluid and the solvent being a liquid selective to at least one of the remaining components of said fluid, the said solid and any solvent used in the process being characterized in that the solvent is not received into the pores of the solid adsorbent, after said contacting, separating said solid adsorbent and said solvent from each other and separately recovering from each of said solid adsorbent and said solvent, after their separation, the components adsorbed and absorbed, respectively, thereon and therein.

8. A process for the separation of hydrocarbon fluids which can be adsorbed by a solid adsorbent from fluids soluble in a liquid absorbent from a mixture containing the same which comprises contacting said mixture with a slurry of solid adsorbent and liquid absorbent, separating the solid adsorbent and liquid absorbent, recovering the fluid adsorbed on the solid adsorbent, and recovering the fluid absorbed in the liquid absorbent.

9. A process for the separation from each other components of a hydrocarbon fluid mixture, comprising (a) fluids which can be adsorbed by a solid adsorbent, (b) fluids which can be absorbed in a liquid absorbent, and (c) fluids incapable of being adsorbed by said solid adsorbent and incapable of being absorbed in said liquid absorbent, which comprises contacting said fluid with a slurry of said solid adsorbent and said liquid absorbent, separating the solid adsorbent, from the remaining liquid, said remaining liquid comprising said liquid absorbent, said fluids which can be absorbed in said liquid absorbent, and said fluids incapable of being adsorbed by said solid adsorbent and incapable of being absorbed in said liquid absorbent, recovering the fluids adsorbed by said solid adsorbent, resolving said remaining liquid into a liquid absorbent phase and an absorbent-free liquid phase, recovering said absorbent-free liquid phase, and recovering the fluids absorbed in said liquid absorbent phase.

10. The process of claim 9 wherein (a) comprises fluids of normal paraffinic hydrocarbons boiling up to about 450° F., (b) comprises fluids of aromatic hydrocarbons, and (c) comprises fluids of naphthenic and isoparaffinic hydrocarbons, and wherein said solid adsorbent is a molecular sieve, and wherein said liquid absorbent is selected from the group consisting of furfural, phenol, and nitrobenzene, said liquid absorbent being incapable of passing through the pores of the said molecular sieve.

References Cited in the file of this patent

UNITED STATES PATENTS

| | | |
|---|---|---|
| 2,522,426 | Black | Sept. 12, 1950 |
| 2,585,490 | Olsen | Feb. 12, 1952 |
| 2,681,335 | Gorin | June 15, 1954 |
| 2,743,818 | Higuchi | May 1, 1956 |
| 2,770,663 | Grote | Nov. 13, 1956 |
| 2,779,718 | Capell et al. | Jan. 29, 1957 |
| 2,818,449 | Christensen et al. | Dec. 31, 1957 |
| 2,886,522 | Cooper et al. | May 12, 1959 |